United States Patent
Voigt, III et al.

(10) Patent No.: US 8,127,491 B1
(45) Date of Patent: Mar. 6, 2012

(54) ON-DEMAND CONTROL OF SUBSURFACE WATERING

(76) Inventors: John Louis Voigt, III, San Diego, CA (US); Joseph Peter Inzunza, San Diego, CA (US)

( * ) Notice: Subject to any disclaimer, the term of this patent is extended or adjusted under 35 U.S.C. 154(b) by 313 days.

(21) Appl. No.: 12/467,486

(22) Filed: May 18, 2009

Related U.S. Application Data

(60) Provisional application No. 61/128,049, filed on May 19, 2008.

(51) Int. Cl.
*A01G 29/00* (2006.01)

(52) U.S. Cl. ............................................. 47/48.5

(58) Field of Classification Search ............... 47/48.5, 47/79; 405/36, 37, 46
See application file for complete search history.

(56) References Cited

U.S. PATENT DOCUMENTS

| | | | |
|---|---|---|---|
| 349,874 A | 9/1886 | Buhrer | |
| 419,242 A | 1/1890 | Brown | |
| 656,887 A | 8/1900 | Golibart | |
| 3,443,385 A | 5/1969 | Vollmer | |
| 3,754,352 A | 8/1973 | Bates | |
| 3,900,962 A * | 8/1975 | Chan | 47/48.5 |
| 4,060,991 A | 12/1977 | Reese | |
| 4,083,147 A | 4/1978 | Garrick | |
| 4,281,625 A | 8/1981 | Kasai | |
| D278,076 S | 3/1985 | Dryden | |
| 4,864,771 A | 9/1989 | Fah | |
| 5,836,106 A | 11/1998 | Alex | |
| 2004/0139650 A1 * | 7/2004 | Haq | 47/48.5 |

* cited by examiner

*Primary Examiner* — Monica Williams
(74) *Attorney, Agent, or Firm* — Edward W. Callan

(57) ABSTRACT

A watering device for deployment within soil for watering vegetation by releasing water into the soil in which the vegetation is growing. The device includes a container that is shaped for being deployed at least partially within soil. The container has an inlet for receiving a flow of water into the container and a plurality of apertures through which water can flow from the container. A flow-control assembly is coupled to the inlet of the container for regulating the flow of water into the container in accordance with a demand for water from the soil. The assembly includes a float disposed for rising and falling in accordance with the level at which water accumulates within the container; and a valve coupled to the float for regulating the flow of water into the container through the inlet in accordance with the level of the float. When the container is deployed at such a depth in soil that water can flow through the apertures of the container into the soil, and the soil becomes so saturated with water that the water flowing into the container accumulates within the container, the level of the float rises as the water accumulates and thereupon causes the float to rise until the valve shuts off the flow of water into the container through the inlet.

10 Claims, 2 Drawing Sheets

Cut Away View

ON-DEMAND CONTROL OF SUBSURFACE WATERING

CROSS REFERENCE TO RELATED APPLICATION

This is a continuation-in-part of co-pending provisional application No. 61/128,049, filed May 19, 2008.

BACKGROUND OF THE INVENTION

The present invention pertains to devices for subsurface watering of vegetation, such as trees, bushes, vines and other plants.

It is known to water vegetation by deploying within soil in which vegetation is growing a watering device that has an inlet for receiving a flow of water into the container and a plurality of apertures through which water can flow from the container and into the soil.

SUMMARY OF THE INVENTION

The present invention provides a flow-control assembly for a watering device that is adapted for deployment within soil for watering vegetation by releasing water into the soil in which the vegetation is growing, wherein the assembly is adapted for being coupled to an inlet of a container that is shaped for being deployed at least partially within soil and has said inlet for receiving a flow of water into the container and a plurality of apertures through which water can flow from the container, said assembly comprising: a casing dimensioned for placement within the container; a float having an open bottom and a closed top with a projection extending from the top, wherein the float is disposed within the casing for sensing a demand for water by the soil in which a said container is deployed by rising and falling in accordance with the level at which water accumulates within the container when the assembly is coupled to the inlet of the container; and means for regulating the flow of water into the container through the inlet in accordance with the sensed demand for water by the soil, the regulating means comprising; a float-controlled valve dimensioned for placement within the container above the float for regulating the flow of water into the inlet of the container through an orifice in the valve in accordance with the level of the float wherein the projection extending from the top of the float is disposed for entering the orifice in the valve as the level of the float rises.

The present invention further provides a watering device in which a flow-control assembly for regulating the flow of water into a said container in accordance with a demand for water from the soil in which the container is deployed is so coupled to the inlet of a said container.

The flow-control assembly of the present invention conserves water by controlling the flow of water into the soil in accordance with the demand of the soil for additional water.

Additional features of the present invention are described with reference to the detailed description.

DETAILED DESCRIPTION

Figure 1:
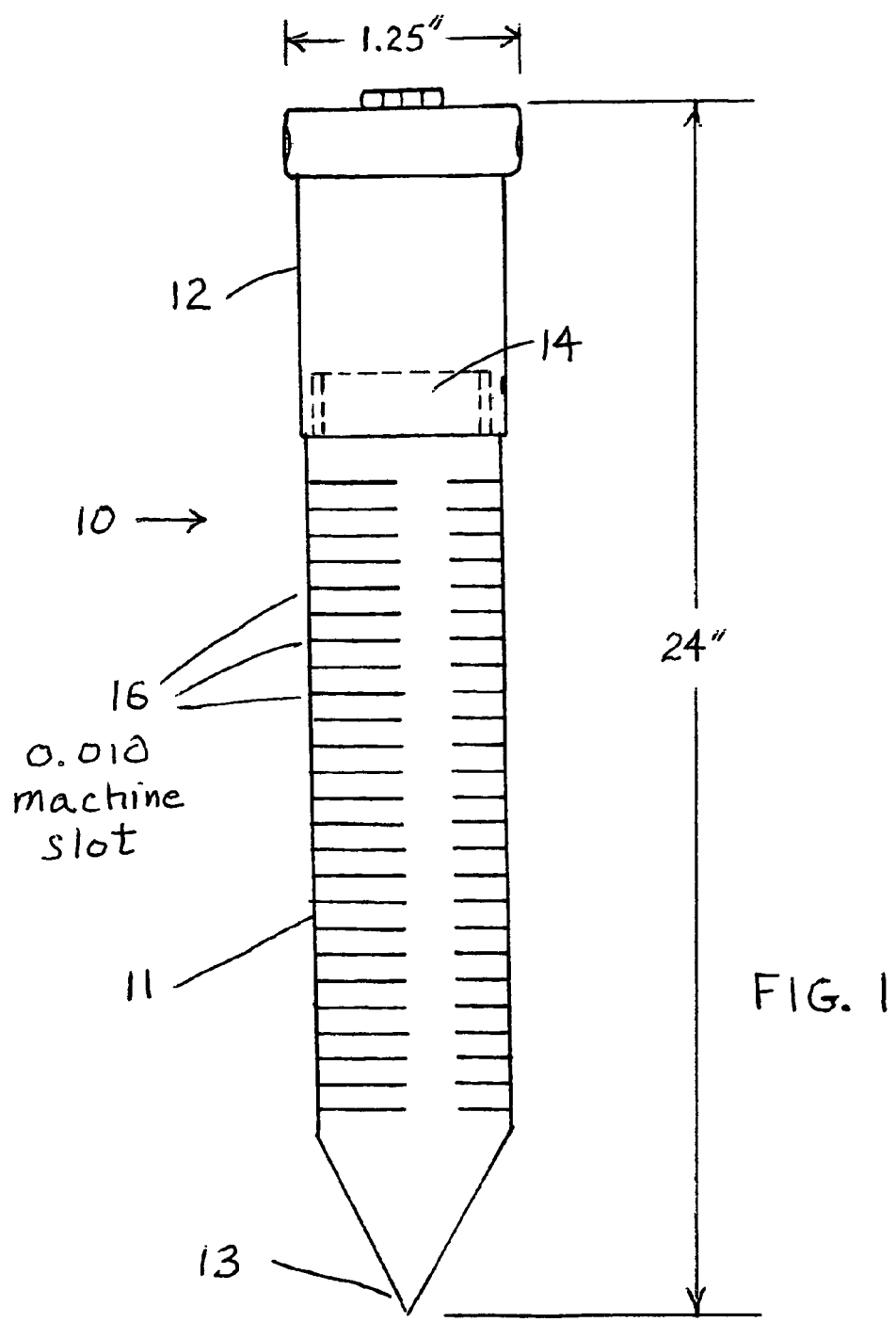
FIG. 1 is a view of an exemplary embodiment of a watering device according to the present invention.
Figure 2:
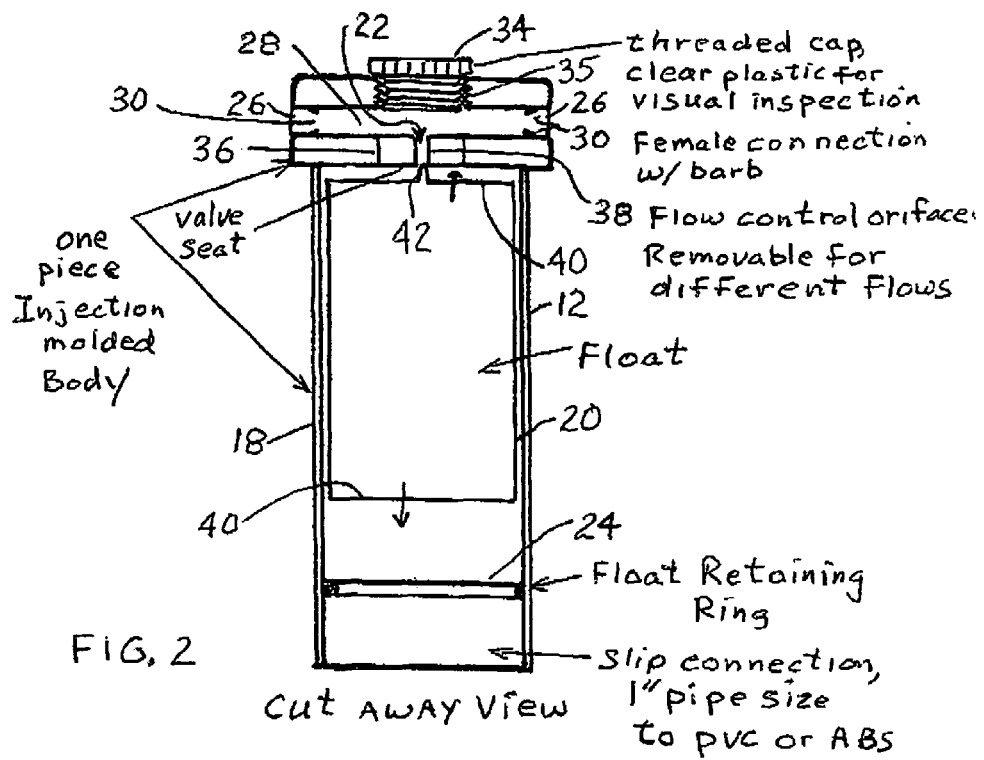
FIG. 2 is an interior view of the flow-control assembly of the watering device shown in FIG. 1.
Figure 3:
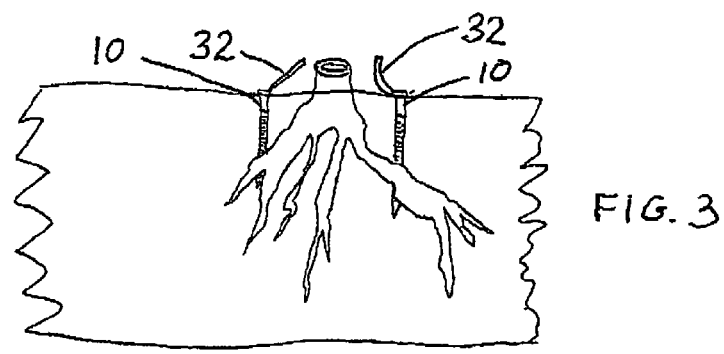
FIG. 3 illustrates the deployment in soil of a pair of watering devices according to the present invention.

Referring to FIGS. 1, 2 and 3, one embodiment of a watering device 10 according to the present invention includes a container 11 and a flow control assembly 12. The container 11 is shaped with a pointed bottom 13 for being deployed at least partially within soil, as shown in FIG. 3. The container 11 has at least one inlet 14 for receiving a flow of water into the container 11 and a plurality of lateral slot-like apertures 16 through which water can flow from the container 11.

The flow-control assembly 12 is adapted for being coupled to the inlet 14 of the container 11. The flow control assembly 12 includes a casing 18 and a float 20, a float-controlled valve 22 and a float retaining ring 24, all of which 20, 22, 24 are disposed within the casing 18. The casing 18 has at least one port 26 and a chamber 28 that communicates with the port(s) 26 and the valve 22 for receiving water from an external source that flows through the port(s) 26, and for enabling the received water to flow through the valve 22 and into the inlet 14 of the container 11.

Female barbs 30 are disposed in the port(s) 26 for coupling the chamber 28 to hose(s) 32, which can be connected to a source of water.

A manually operable threaded cap 34 is inserted through a threaded opening 35 in the top of the casing 18 and into the chamber 28 for controlling the size of the chamber 28 and thereby regulating the flow of water into the container 11. Preferably the cap 34 is made of clear plastic for enabling some degree of visual inspection of the valve 22 and the chamber 28.

The float retaining ring 24 is disposed within the flow-control assembly 12 to limit the descent of the float 14 within the assembly 12.

The valve 22 includes a removable member 36 defining a flow control orifice 38 through which water flows into the container 11. The orifice 38 is of a dimension that is selected in accordance with a desired rate of flow of water through the valve 22. The desired rate of flow can be changed by replacing the removable member 36 with another removable member 36 having an orifice 38 of a different dimension for controlling the rate of flow through the valve 22.

When the flow control assembly 12 is coupled to the inlet of the container 11, the float 20 is disposed for rising and falling 11 in accordance with the level at which water accumulates within the container 11. The valve 22 is disposed within the flow control assembly 12 and coupled to the float 20 for regulating the flow of water into the container 11 through the orifice 38 in accordance with the level of the float 20.

The float 20 is cylindrical with an open bottom and a closed top 40. The top 40 has a projection 42 that is disposed for entering the orifice 38 as the level of the float 20 rises. The float 20 is pushed upward as water accumulates in the container 11 by air that is captured within the float 20 and is compressed by the accumulating water. Accordingly, when the soil is saturated water will cease to flow into the soil from the container 11.

A preferred embodiment of the container 11 includes an injection molded polyvinylchloride (PVC) or ABS plastic pipe having arrays of slot-like apertures 16 that are machine cut into the pipe 11 to allow water to flow on demand from the watering device 10 into the soil.

In a preferred embodiment, the float 20 and valve 22 are constructed entirely of PVC and high density polyethylene (HDPE).

The watering device 10 can be wrapped with geo-textile fabric when deployed in soil to inhibit root growth and soil penetration. A fabric such as MIRAFI 140NC is suitable.

The watering device 10 can be constructed in different diameters, 1" or greater, variable lengths depending on root depth and multiple configurations for different soil types and watering requirements.

In the embodiment shown in FIGS. 1 and 2, the watering device 10 the container 11 has a predominant outside diameter of approximately one-inch, the flow control assembly 12 has a diameter of approximately one-and-one-quarter-inch, the longitudinal opening of each slot-like aperture 16 is approximately 0.010-inch and the overall length of the device 10 is approximately 24-inches.

The watering device 10 can be constructed in different diameters and variable lengths depending on root depth and/or in various configurations for different soil types and watering requirements.

The watering device 10 can be used indoors or outside.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. A flow-control assembly for a watering device that is adapted for deployment within soil for watering vegetation by releasing water into the soil in which the vegetation is growing, wherein the assembly is adapted for being coupled to an inlet of a container that is shaped for being deployed at least partially within soil and has said inlet for receiving a flow of water into the container and a plurality of apertures through which water can flow from the container, said assembly comprising:
   a casing dimensioned for placement within the container;
   a float having an open bottom and a closed top with a projection extending from the top, wherein the float is disposed within the casing for sensing a demand for water by the soil in which a said container is deployed by rising and falling in accordance with the level at which water accumulates within the container when the assembly is coupled to the inlet of the container; and
   means for regulating the flow of water into the container through the inlet in accordance with the sensed demand for water by the soil, the regulating means comprising;
   a float-controlled valve within the casing above the float for regulating the flow of water into the inlet of the container through an orifice in the valve in accordance with the level of the float;
   wherein the projection extending from the top of the float is disposed for entering the orifice in the valve as the level of the float rises:
   wherein the float is disposed for rising and falling in accordance with the level at which water accumulates within the container when the assembly is coupled to the inlet of the container; and
   wherein the valve is coupled to the float for regulating the flow of water into the container through the inlet in accordance with the level of the float when the assembly is coupled to the inlet of the container;
   wherein when the assembly is coupled to the inlet of the container and the container is deployed at such a depth in soil that water can flow through the apertures of the container into the soil, and the soil becomes so saturated with water that the water flowing into the container accumulates within the container, the level of the float rises as the water accumulates and thereupon causes the float to rise until the valve shuts off the flow of water into the container through the inlet.

2. A flow-control assembly according to claim 1, wherein the casing has a port and a chamber that communicates with the port and the valve for receiving water from an external source that flows through the port and for enabling said received water to flow through the valve and into the inlet of the container and
   means for controlling the size of the chamber in order to regulate the flow of water through the valve into the inlet of the container.

3. A flow-control assembly according to claim 2, wherein the controlling means is manually operable.

4. A flow-control assembly according to claim 2, wherein the valve includes a removable member defining a flow control orifice through which water flows into the container, with the orifice being of a dimension that is selected in accordance with a desired rate of flow of water through the valve.

5. A flow-control assembly according to claim 1, wherein the valve includes a removable member defining a flow control orifice through which water flows into the container, with the orifice being of a dimension that is selected in accordance with a desired rate of flow of water through the valve.

6. A watering device for deployment within soil for watering vegetation by releasing water into the soil in which the vegetation is growing, comprising:
   a container shaped for being deployed at least partially within soil and having an inlet for receiving a flow of water into the container and a plurality of apertures through which water can flow from the container; and
   a flow-control assembly coupled to the inlet of the container for regulating the flow of water into the container in accordance with a demand for water from the soil in which the container is deployed, the flow control assembly comprising:
   to a casing dimensioned for placement within the container;
   a float having an open bottom and a closed to with a projection extending from the top, wherein the float is disposed within the casing for sensing a demand for water by, the soil in which a said contain er is deployed by rising and falling in accordance with the level at which water accumulates within the container when the assembly is coupled to the inlet of the container; and
   means for regulating the flow of water into the container through the inlet in accordance with the sensed demand for water by the soil, the regulating means comprising;
   a float-controlled valve within the casing above the float for regulating the flow of water into the inlet of the container through an orifice in the valve in accordance with the level of the float;
   wherein the projection extending from the top of the float is disposed for entering the orifice in the valve as the level of the float rises;
   wherein the float is disposed for rising and falling in accordance with the level at which water accumulates within the container when the assembly is coupled to the inlet of the container; and
   wherein the valve is coupled to the float for regulating the flow of water into the container through the inlet in accordance with the level of the float when the assembly is coupled to the inlet of the container;

wherein when the assembly is coupled to the inlet of the container and the container is deployed at such a depth in soil that water can flow through apertures of the container into the soil, and the soil becomes so saturated with water that the water flowing into the container accumulates within the container, the level of the float rises as the water accumulates and thereupon causes the float to rise until the valve shuts off the flow of water into the container through the inlet.

7. A watering device according to claim 6, wherein the casing has a port and a chamber that communicates with the port and the valve for receiving water from an external source that flows through the port and for enabling said received water to flow through the valve and into the inlet of the container and means for controlling the size of the chamber in order to regulate the flow of water through the valve into the inlet of the container.

8. A watering device according to claim 7, wherein the controlling means is manually operable.

9. A watering device according to claim 7, wherein the valve includes a removable member defining a flow control orifice through which water flows into the container, with the orifice being of a dimension that is selected in accordance with a desired rate of flow of water through the valve.

10. A watering device according to claim 6, wherein the valve includes a removable member defining a flow control orifice through which water flows into the container, with the orifice being of a dimension that is selected in accordance with a desired rate of flow of water through the valve.

* * * * *